July 7, 1936.                H. J. DILLON                2,047,011
                           CHASSIS STRUCTURE
                   Original Filed July 24, 1933    2 Sheets-Sheet 1
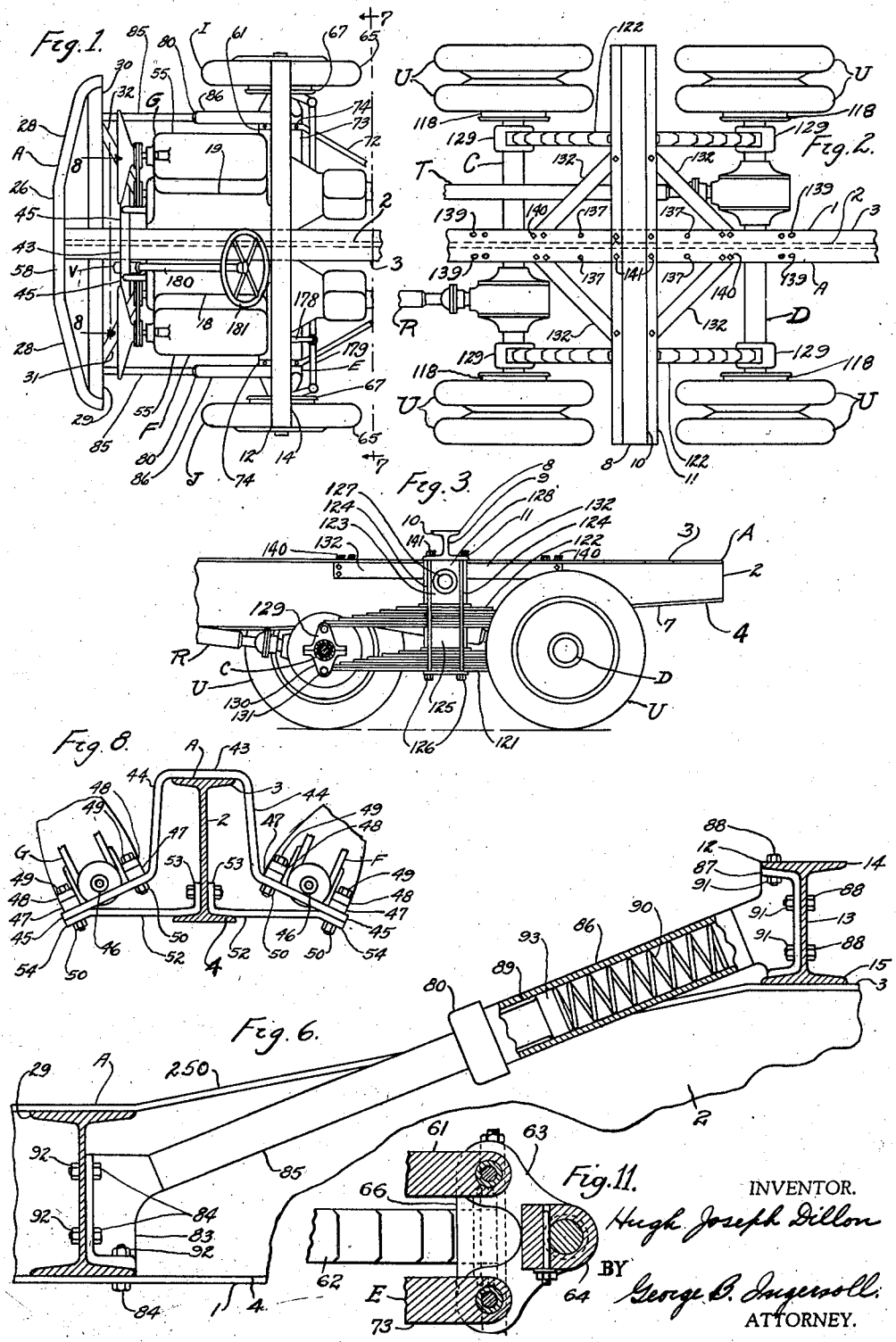
INVENTOR.
Hugh Joseph Dillon
BY
George B. Ingersoll
ATTORNEY.

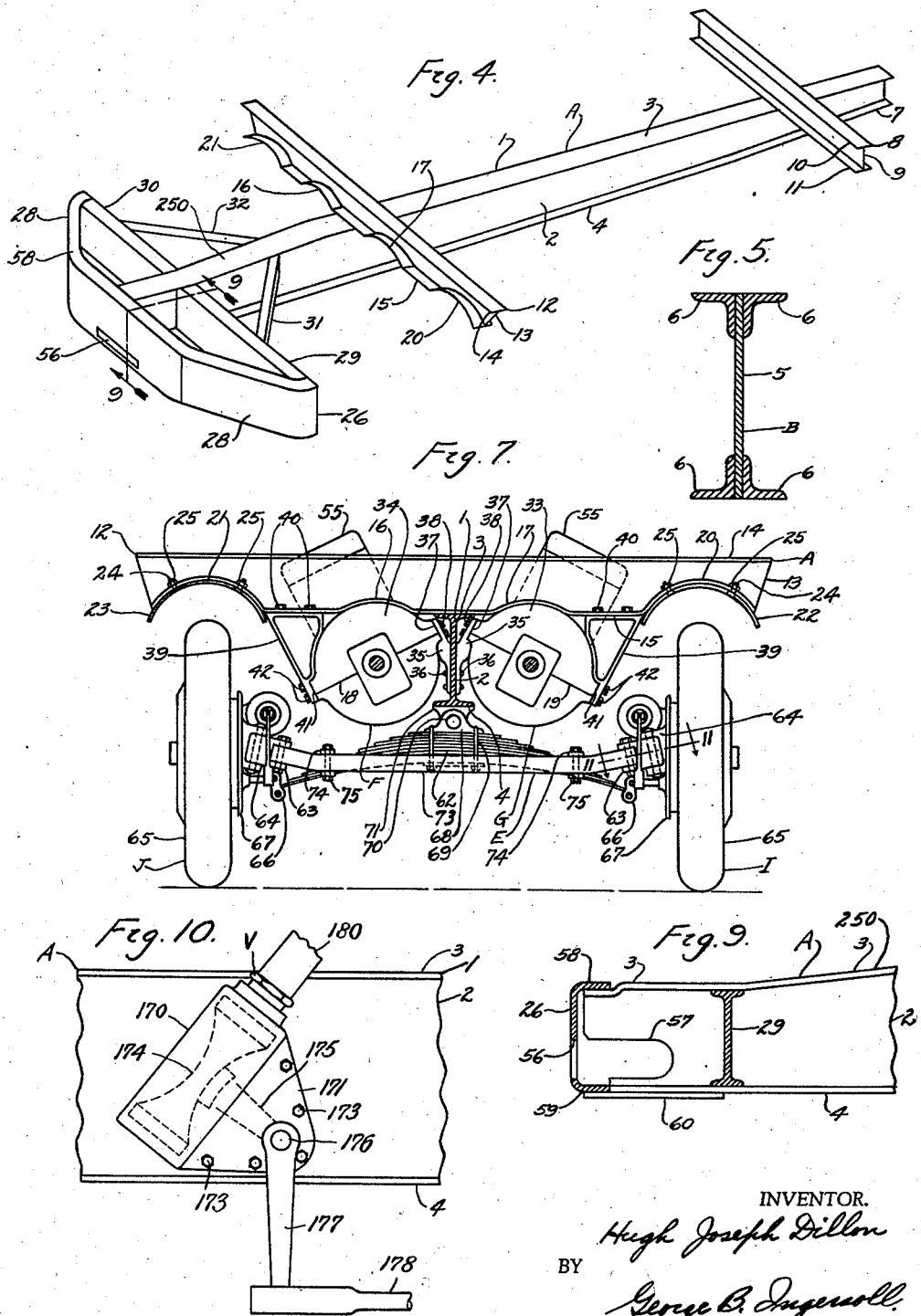

Patented July 7, 1936

2,047,011

UNITED STATES PATENT OFFICE 2,047,011

CHASSIS STRUCTURE

Hugh Joseph Dillon, Highland Park, Mich.

Original application July 24, 1933, Serial No. 681,851. Divided and this application January 12, 1934, Serial No. 706,333

14 Claims. (Cl. 180—22)

My invention relates to improvements in chassis structure for vehicles in which a frame member is operatively connected with a plurality of driving axles operatively driven by a pair of motors supported on the frame member; and the objects of my improvements are, first, to provide a chassis structure having a main supporting frame member extending longitudinally and at the approximate longitudinal center of the vehicle; second, to provide a chassis structure having axle units in which a main frame member is provided with transversely extending members located approximately at the load application point of the pair of axle units; third, to provide a chassis structure for a vehicle having a single main longitudinal member; fourth, to provide a chassis structure for a vehicle having a pair of power units, said chassis having a main supporting member between the pair of units together with a transversely extending cross member for supporting the rear ends of the pair of power units, the forward central ends of the power units being supported directly from the main supporting frame member; fifth, to provide a chassis structure for a vehicle having an engine and fender members supported directly on a frame member extending transversely to a single main frame member of the chassis structure; sixth, to provide a chassis structure having a bumper member supported on a main frame member and braced by a resilient mechanism; seventh, to provide a chassis structure for a vehicle, said chassis structure being provided with adjustment means to provide different vehicle wheel bases; and eighth, to provide a chassis structure having a main frame member with a steering gear member mounted thereon.

This patent application is a divisional application of my present application, Serial No. 681,851, filed July 24th, 1933 for improvements in a Vehicle.

I attain these objects by mechanism illustrated in the accompanying drawings, in which—

Figure 1 is a partial plan view of the front end of a vehicle incorporating my chassis structure; Fig. 2, a partial plan view of the rear end of a vehicle incorporating my chassis structure; Fig. 3, a partial side view of the vehicle as disclosed in Fig. 2; Fig. 4, a perspective view of the frame assembly of the chassis structure; Fig. 5, a sectional view of a fabricated main frame member of the chassis structure; Fig. 6, a side and partial sectional view of one of the brace units connecting the front bumper with the front frame cross member; Fig. 7, a vertical sectional view of a chassis structure taken on a vertical line 7—7 Fig. 1 approximately at the rear of the pair of engine assemblies of the vehicle; Fig. 8, a vertical sectional view through the main frame member together with its supporting mechanism for the front of the pair of engine assemblies on the line 8—8, Fig. 1; Fig. 9, a vertical sectional view of the bumper and frame construction taken on the line 9—9, Fig. 4; Fig. 10, a side elevation disclosing a steering gear supported on the main frame member of the chassis structure; and Fig. 11, a sectional view of the steering axle assembly taken on the line 11—11, Fig. 7.

Similar numerals refer to similar parts throughout the several views.

The frame assembly A of the chassis structure is located so that the main frame member 1 extends longitudinally along the center or approximate longitudinal center of the vehicle and may be constructed of rolled channel I beam construction as disclosed in Figs. 1, 2, 3, and 4 with a main vertical web 2 and the integral flanges 3 and 4 extending transversely therefrom at the top and bottom of the main frame member 1, or if desired the frame member 1 may be fabricated from a single vertical plate or member 5 and the angle members 6 secured thereto, as by welding or other similar or suitable means, to form a fabricated I beam section member assembly B of the desired strength and rigidity, as disclosed in Fig. 5.

It is to be noted that the web 2 together with the flange 4 may be formed and arranged to provide the frame member 1 with a tapered section, as disclosed for instance at 7, Figs. 3 and 4 to form a main frame member 1 of the desired strength, the mass of material being thus distributed and located to provide the greatest strength at the point or points of maximum stress.

The frame assembly A is provided with the rear cross member 8 which may also be provided with the vertical web 9 and the flanges 10 and 11 extending therefrom and may be secured to the flange 3 of the frame member 1 by welding, riveting, or other suitable or similar means, or by bolting as hereinafter disclosed, the rear cross member 8 being preferably located directly above the center of the rear axle assemblies C and D of the vehicle. The front cross member 12 may also be provided with the vertical web 13 and the upper and lower flanges 14 and 15 extending therefrom and may be secured to the flange 3 of the frame member 1 by welding, riveting, or other suitable or similar means, the front cross member 12 being preferably located directly over the center of the front axle assembly E. The front axle assembly E and the rear axle assemblies C and D are incorporated in the drawings to disclose sufficient of the vehicle structure to explain the use of my chassis structure. The front cross member 12 may extend outwardly from the main frame member 1 sufficiently to extend to approximately the outside portions of a cab and body structure which may be installed on the frame assembly A. Also if desired, the front and rear cross members 12 and 8 may be provided with a tapered section, as disclosed relative to the main frame 1, with its minimum normal section at their outer extremities and having an increased section as it progresses toward the main frame member 1 to provide proper distribution of the material to provide in turn the greatest strength at points of maximum stresses.

Also the lower flange 15 of the frame cross member 12 is provided with curved, radial, spherical, or depressed surfaces 16 and 17 for receiving and engaging similar surfaces on the housings 18 and 19 of the engine assemblies F and G as hereinafter disclosed.

Also the frame cross member 12 may be further provided with the curved, radial, spherical or depressed surfaces 20 and 21 for receiving and engaging the fenders 22 and 23 which may be secured thereto by the bolts 24 and the nuts 25 or by other or similar means.

It is to be noted that with the location of the front cross member 12 and the rear cross member 8 located directly over the load centers of the axle units, the main frame member 1 will be relieved of its stresses and will be approximately uniformly loaded due to the distribution of the load thereon. This may be further accomplished by making the side members of the body unit, to be installed on the frame assembly A with suitable sections and sizes to carry the load in the body unit with approximately no deflection therein to reinforce and stiffen the frame assembly A when the body unit is secured thereto and to impose the body load directly on to the frame cross members 12 and 8.

The main frame member 1 may be tapered on its upper side as at 250 to provide a better and more economical distribution of material to withstand load stresses, in a manner similar to the tapered portion 7 at the rear of the frame member 1 and also to permit the frame member 1 to blend into and conform with the desired size of the bumper member 26 with which the frame assembly A is provided, the bumper member 26 being suitably secured to the front portion of the frame member 1, said bumper member 26 being provided with the angularly positioned or rearwardly inclined portions 28 which may be so located as to conform with the shape or outline of the cab unit as desired.

The rearwardly inclined portions 28 of the bumper 26 are connected at their rear extremities with the members 29 and 30 which extend to and are suitably connected with the frame cross member 1 as by welding or other suitable means. The frame assembly A may be further provided with the members 31 and 32 which extend rearwardly from the members 29 and 30 and diagonally with the frame member 1, the members 31 and 32 being suitably connected with the members 29 and 30 and the frame member 1 by welding or other suitable means.

The housings 18 and 19 of the engine assemblies F and G are provided with curved, spherical, or radial surfaces on the bell housings 33 and 34 which engage and fit with the similar surfaces 16 and 17 of the frame cross member 12 and are supported therein by the inner brackets 35 which are suitably secured by the rivets 36 or by welding or similar means to the web 2 of the main frame member 1, said inner brackets 35 being further secured to the inner supporting arms or portions 37 of the engine or bell housings 33 and 34, by the bolts or screws 38.

The housings 18 and 19 of the engine assemblies F and G are further supported in the curved surfaces 16 and 17 of the front cross member 12 by the outer support brackets 39 which may be secured to the lower flange 15 of the front cross member 12 by the bolts or screws 40, the outer support brackets 39 being further secured to the outer supporting arms or portions 41 of the engine of bell housings 33 and 34 by the bolts or screws 42. It is to be noted that the engine assemblies F and G are thus each mounted on outer sides of the main or central frame member 1 and each of said engine assemblies F and G are rendered readily removable from their mountings without lifting over the usual side rails of a conventional frame assembly in which a pair of side rails are located at the extreme outer sides of a frame assembly, the removal of the bolts 38 and 42 together with the bolts 40 permitting the ready removal of the outer support brackets 39 and the engine assemblies F and G.

The engine assemblies F and G are further supported at their front portions by the bracket member 43, which, if desired, may be constructed in one piece and straddle mounted over the main frame member 1 as disclosed in Fig. 8, the bracket member 43 being suitably secured, as by welding or other suitable or similar means, to the flange 3, the bracket member 43 being provided with the downwardly extending portions 44 which are in turn provided with the portions 45 which may extend under the crankshaft extension 46, which is suitably supported and operatively mounted in the structure of the engine assemblies F and G, to support the blocks or members 47, which may be constructed of resilient material, such as rubber composition or similar material, the blocks 47 engaging the lugs 48 which may be formed integrally with or suitably attached to the forward portions of the housing structure of the engine assemblies F and G, the portions 45, the blocks 47 and the lugs 48 being secured together by the bolts 49 and the nuts 50, which when removed permit the front portions of the engine assemblies F and G to be readily removed from their supported positions in a similar manner as above described relative to the rear support mechanism of the engine assemblies F and G. If desired, the brackets 52 may be used to support the portions 45 of the brackets 43, the brackets 52 being provided with the flange portions 53 for attaching to the web 2, by means of bolts and nuts as disclosed or by welding or other suitable means, the bracket 52 being further provided with the portions 54 for connecting to the portions 45 of the brackets 43, the portions 54 being secured by welding or other suitable means to the portions 45, the bolts 49 being adapted to further extend through the portions 54.

It is to be noted that the engine assemblies F and G, by the above described mechanism, will be supported in angular positions relative to one another and to the main frame member 1, the engine assemblies F and G being herein disclosed as having their cylinder portions 55 supported approximately at an angle of thirty-five degrees from a vertical line, the angle of inclination of the engine assemblies F and G being varied to suit various engines and vehicles.

It is to be noted that the above disclosed angular positions of the engine assemblies F and G will provide sufficient room or passage therebetween to permit the operator or driver of the vehicle to enter and pass, between the engine assemblies F and G, when a cab member is mounted directly over the engine assemblies F and G and provided with a door at its front end, such a cab enclosure and unit being disclosed and claimed in my patent application, Serial No. 681,850, filed July 24, 1933, now Patent No. 1,995,-501 dated March 26, 1935 for a Vehicle cab.

In order to facilitate the above described entrance of the operator to the space between the engine asemblies F and G of a vehicle, the bumper member 26 is provided with an opening 56 to provide a step for the operator, this construction being more fully disclosed in Fig. 9, the web 2 of the frame cross member 1 being cut away at 57 to provide sufficient room for the insertion of the operator's foot within and through the opening 56, the upper flange 3 of the frame member 1 being suitably formed to extend within and adjacent the upper flange 58 of the bumper member 26, the lower flange 59 of the bumper member 26 and the lower flange 4 of the frame member 1 being suitably connected by the plate or gusset member 60 which may be secured by welding or other suitable means.

The front axle assembly E herein disclosed is of the type disclosed and claimed in my application Serial No. 681,849, filed July 24, 1933, now Patent No. 1,995,500, dated March 26, 1935 for Spring and axle construction for vehicles, and as similarly disclosed therein, comprises a pair of axle beam members 61 and 73 connected at their ends by the bracket members 63 on which are pivotally supported the spindle members 64 which operatively support the wheel assemblies I and J which are provided with the front wheels 65 and the brake drums 67.

The front spring 62 is located between the axle beam members 61 and 73 and extends transversely to the main frame member 1 and is connected to the bracket members 63 by the shackles 66.

The front spring 62 is connected at the spring seat 68 by the spring clips 69 and the spring seat 68 is pivotally mounted on the pin 70 which is suitably secured in the bracket 71 which is suitably secured to the lower flange 4 of the main frame member 1.

The torque member 72 is provided with the upper and lower flange portions 74 which straddle and extend above and below the axle beam members 61 and 73, as disclosed in Fig. 7, the upper and lower frame portions 74 of the torque member 72 being secured to the axle beam members 61 and 73 by the bolts 75 and the nuts 76, the torque member 72 having diagonal portions, as disclosed in Fig. 1, which may be suitably secured at their rear ends to the main frame member 1.

The above described axle assembly E is disclosed and described herewith sufficiently to indicate the front end construction of the vehicle as it relates to assembly and securement with my chassis structure.

To further support and brace the bumper member 26, the brackets 83 may be secured to the members 29 and 30 by the bolts 84 and nuts 92 or other suitable or similar means, the brackets 83 being provided with the extension members 85 which extend within the tubular members 86 which are provided with the brackets 87 which in turn are secured to the web 13 of the front cross member 12 by the bolts 88 and nuts 91 or other suitable or similar means, the extension members 85 being provided with the ends 93 which are slidably mounted in the bores 89 of the tubular members 86 and engage the springs 90 which are mounted in the bores 89 in such manner to provide a resilient cushion to absorb thrust reactions of the members 29 and 30 when flexed by a thrust on the bumper member 26, thus allowing for a certain amount of flexibility in the frame assembly A when the bumper member 26 is collided with, thus confining the results of a collision to the front portions of the vehicle. The open end of the bores 89 of the tubular members 86 are closed by the cap members 80 through which extend the extension members 85, the cap members 80 being secured to the tubular members 86 as by threading or other suitable or similar means.

The driving axle assemblies C and D are connected by the rear springs 121 and 122 which are suitably secured to the brackets 123 by the spring clips 124, the spacer members 125 and the nuts 126, the brackets 123 being pivotally mounted on the shafts 127 which are suitably secured in the brackets 128 which are in turn suitably secured to the rear frame cross member 8.

The rear springs 121 and 122 are pivotally connected to the brackets 129 and 130 by means of the pins 131 which are suitably secured in the brackets 129 and 130, the brackets 129 and 130 being suitably secured together with the driving axles C and D. The rear frame cross member 8 may be braced by the diagonal frame members 132 which may be secured at their outer ends to the rear frame cross member 8 and at their inner ends to the main frame cross member 1.

It is to be noted that the driving axle assemblies C and D will be pivotally mounted on the shaft 127 which will allow the driving axle assemblies C and D to oscillate about the shafts 127 thus allowing a free operating movement for the driving axles C and D.

It is to be noted that my invention of the chassis structure as above disclosed will provide a three point suspension for the frame assembly A, the forward part of the frame assembly A being mounted above the center of the front spring 62 whereas the rear portion of the frame assembly A will be mounted above the spring members 121 and 122, thus providing a main load carrying member which is suspended below the frame members, which are operatively connected by the wheel members.

The use of commercial vehicles requires a great variation in the length of wheel bases and to permit my vehicle design to be readily and adjustably adapted to different lengths of wheel bases, the main frame member 1 may be provided with a series of holes 137 to permit the rear frame cross member 8 to be secured to the main frame member 1 by the bolts 141, the main frame member 1 being further provided with a series of holes 139 to permit the members 132 to be secured thereto by the bolts 140.

The manufacturer of the vehicle may thus ship the vehicle to dealers with the frame members 8 and 132 bolted, or secured by similar means, and if the vehicle is not thus provided with the proper wheel base for the particular requirements for which the dealers eventually sell the truck, the dealers may move the rear frame cross member, together with the members 132, to the proper location, as indicated by the series of holes 137 and 139, to meet the necessary wheel base requirements at which time the dealers may, if desired further secure the frame members 8 and 132 in position by permanent means, such as rivets, welding or similar means.

The series of holes 137 and 139 will usually be spaced in distances of six or twelve inches which correspond to the amount of variation usually found in wheel base lengths. It is thus to be noted that I have provided means whereby vehicle wheel bases may be varied by economical adjustment means to meet additional wheel base requirements by the ultimate purchaser, the proper length of propeller shafts being readily assembled in their operative positions in the vehicle to meet the requirements of the adjusted wheel bases.

The steering gear assembly V as disclosed in Figure 10 will be provided with a housing 170 which will be provided with the flange 171 which may be suitably secured to the web 2 of the main frame member 1 by the bolts 173. The steering gear assembly V is provided with the conventional worm 174 and sector or lever member 175 which operates the chuck or cross shaft 176 and oscillates the steering arm 177 to actuate the steering drag link 178 which is suitably connected to the steering arm 179 of the front axle assembly E.

The steering gear assembly V is further provided with column 180 which is suitably connected to the steering wheel 181. It is to be noted that the steering gear assembly V may be mounted adjacent and on the main frame member 1, thus providing a more secure, substantial and convenient mounting for the steering gear assembly V.

The propeller shaft assemblies R and T may be operatively connected with rear driving axle assemblies C and D and with the engine assemblies F and G.

The driving axle assemblies C and D will be provided with differential driving assemblies within the differential housings 115 and 116, said differential driving assemblies being operatively connected to the propeller shaft assemblies R and T and with the wheel assemblies U which are provided with the brake mechanisms 118.

I claim:

1. In a chassis structure for a vehicle comprising a front and a pair of rear driving axle assemblies each provided with wheel assemblies, the combination of a main frame member extending longitudinally at the longitudinal center of the vehicle, and a pair of cross members extending above and transversely relative to said main frame member, one of cross members extending over the front axle assembly, the other of said cross members extending longitudinally substantially equal distant from and between each of said pair of rear driving axle assemblies, each of said cross members extending outwardly to a vertical plane extending through the wheel assemblies of said axle assemblies.

2. In a chassis structure for a vehicle comprising a pair of rear driving axles together with a front steering axle the combination of a main frame member extending longitudinally at the longitudinal center of the vehicle, a cross member extending transversely relative to said main frame member and between said pair of rear driving axles, a second cross member extending transversely above said steering axle, and a cross member structure extending transversely relative to said main frame member at the forward end of said main frame member, said last mentioned cross member structure having rearwardly inclined portions at its outer extremities.

3. In a chassis structure for a vehicle comprising a pair of driving axles each having driving wheels together with resilient members supported on and connecting the pair of driving axles, the combination of a frame cross member supported on the upper side of and substantially at the central portion of said resilient members, said frame cross member extending beyond said resilient members to substantially the outer extended sides of the driving wheels of said pair of driving axles, said frame cross member extending longitudinally between said pair of driving axles, and a main frame member extending longitudinally substantially at the longitudinal center of the vehicle, said main frame member contacting and being connected to the under side of said frame cross member substantially at its center, said frame and said frame cross member being rigidly connected together and preventing movement therebetween.

4. In a chassis structure for a vehicle comprising a pair of engines, the combination of a frame assembly comprising a main frame member located substantially at the longitudinal center of the vehicle, a bumper member suitably supported by and adjacent the front end of said main frame member, a frame cross member mounted on said main frame member and extending on both sides of said main frame member, and a pair of resiliently actuated brace members connected between the outer end portions of said bumper and said frame cross members, said pair of resiliently actuated brace members together with said bumper and said frame cross members forming substantially rectangular shaped openings adjacent each side of said main frame member, when the chassis structure is viewed from a position thereabove, for containing the pair of engines.

5. In a chassis structure for a vehicle provided with a steering axle together with a pair of driving axles, the combination of a frame assembly comprising a main frame member extending longitudinally at the longitudinal center of the vehicle together with a frame cross member mounted on said main frame member and extending across the vehicle substantially parallel with and above the steering axle, said frame assembly further comprising a second frame cross member mounted on and above said main frame member and extending across the vehicle between the pair of driving axles, means resiliently supporting said frame assembly on the steering axle, said means being connected to the steering axle and to the under side of said main frame member, and a second means resiliently supporting said frame assembly on the pair of driving axles, said second means extending under and being connected to said second mentioned frame cross member and to the pair of driving axles.

6. In a chassis structure for a vehicle comprising axles together with a pair of engine assemblies operatively connected therewith, the combination of a frame assembly comprising a main frame member supported by said axles, a sole frame cross member mounted on said main frame member for supporting the rear portions of said pair of engine assemblies, said sole frame cross member extending on opposite sides of said main frame member, means for suspending the rear portions of said pair of engine assemblies from said sole frame cross member at opposite sides of said main frame member, and a second means comprising a sole member mounted on said main frame member for supporting the front portions of said pair of engine assemblies, said sole member of said second means extending over said main frame member and under the front portions of said pair of engine assemblies.

7. In a chassis structure for a vehicle comprising a steering axle together with a pair of driving axles, the combination of a main frame member extending longitudinally at the longitudinal center of the vehicle, a frame cross member supported by and extending transversely to said main frame member, said frame cross member being located substantially centrally between the pair of driving axles, a second frame cross member supported by and extending transversely to said main frame member, said second frame cross member being located substantially above the longitudinal center of the steering axle, a bumper structure supported by and extending transversely to said main frame member at its forward end, said bumper structure being provided with rearwardly inclined portions at its foward sides, and members connected with said bumper structure, adjacent its rearwardly inclined portions, and to said second frame cross member, said last mentioned members tending to transfer shock loads imposed on the ends of said bumper structure to said second frame cross member and thus to said main frame member.

8. In a chassis structure for a vehicle, the combination of bumper member provided with an opening for receiving the foot of the operator of the vehicle to enable the operator to mount to a position above said bumper member, and a frame member suitably connected with and supporting said bumper member, said frame member having a portion of itself removed at a point adjacent the opening of said bumper member to provide clearance for the foot of the operator.

9. In a chassis structure for a vehicle comprising a pair of engine assemblies together with wheel assemblies and fenders therefor, the combination of a main frame member extending longitudinally between the pair of engine assemblies, a frame cross member supported on said main frame member and provided with depressed surfaces on opposite sides of and adjacent said main frame member, said frame cross member being further provided with depressed surfaces adjacent the wheel assemblies of the vehicle, means for supporting the pair of engine assemblies in the depressed surfaces of said frame cross member and adjacent said main frame member, and means for supporting the fenders of the vehicle in the depressed surfaces of said frame cross member and adjacent the wheel assemblies of the vehicle.

10. In a chassis structure for a vehicle comprising a pair of engine assemblies, the combination of a main frame member extending between the pair of engine assemblies, a frame cross member supported on said main frame member adjacent the rear of the pair of engine assemblies, bracket members mounted on opposite sides of said main frame member and each connected with inner portions of one of the pair of engine assemblies, bracket members supported on and extending below said frame cross member at opposite sides of said main frame member, said last mentioned bracket members being each connected with outer portions of one of the pair of engine assemblies, said first mentioned and said second mentioned bracket members supporting the pair of engine assemblies against said frame cross member, and inclined supporting members suitably mounted on said main frame member and extending on opposite sides thereof, said inclined supporting members being connected with the central portions of the front ends of the pair of engine assemblies.

11. In a chassis structure for a vehicle comprising a pair of engine assemblies, the combination of a main frame member extending between the pair of engine assemblies, a frame cross member supported on and extending on opposite sides of said main frame member and adjacent the rear ends of the pair of engine assemblies, means for supporting the rear of the engine assemblies below said frame cross member, a member supported on said main frame member and extending on opposite sides of said main frame member adjacent the centers of the front ends of each of the pair of engine assemblies, said last mentioned member having inclined portions adjacent each of the centers of the engine assemblies, members suitably mounted on the inclined portions of said member adjacent the centers of each of the pair of engine assemblies, said last mentioned members being connected with the central portions of the pair of engine assemblies, and members suitably mounted on said main frame member and connected with the inclined portions of said member supported on said main frame member and extending on opposite sides thereof adjacent the centers of the front ends of the pair of engine assemblies.

12. In a chassis structure for a vehicle, the combination of a main frame member extending longitudinally substantially at the longitudinal center of the vehicle, a frame cross member supported on and extending on opposite sides of said main frame member, a bumper member supported on and extending on opposite sides and adjacent the front end of said main frame member, said bumper member having rearwardly inclined portions at its ends, frame members connecting the rearwardly inclined portions at the ends of said bumper member with said main frame member, angularly positioned members extending between and connecting said main frame member with said frame members connecting the rearwardly inclined portions, at the ends of said bumper member, with said main frame member, and resiliently actuated members extending on opposite sides of said main frame member, said resiliently actuated members connecting said bumper member and said frame cross member.

13. In a chassis structure for a vehicle comprising a pair of engines each having curved surfaces, the combination of a main frame member extending longitudinally between the pair of engines, and a sole frame cross member extending transversely on said main frame member and provided with curved surfaces located on each side of said main frame member and conforming to and engaging the curved surfaces of the engines to provide means for locating said engines transversely relative to said main frame member, said sole frame cross member having a horizontally extending flange at its lowermost side and extending across said main frame member, said curved surfaces being formed in said horizontally extending flange of said sole frame cross member.

14. In a chassis structure for a vehicle comprising power developing means together with wheel assemblies and fenders therefor, the combination of a sole main frame member, a frame cross member supported on said sole main frame member, said frame cross member being provided with curved surfaces on its lowermost side and adjacent the wheel assemblies, means for supporting the power developing means on said frame cross member adjacent said sole main frame member, and means for supporting the upper surfaces of the fenders against the curved surfaces of said frame cross member.

HUGH JOSEPH DILLON.